United States Patent [19]

Watanabe et al.

[11] Patent Number: 4,827,304

[45] Date of Patent: * May 2, 1989

[54] CAMERA

[75] Inventors: Koji Watanabe; Michio Yagi; Seiichi Isoguchi; Satoshi Harada; Masami Fujita, all of Hachioji, Japan

[73] Assignee: Konishiroku Photo Industry Co., Ltd., Tokyo, Japan

[*] Notice: The portion of the term of this patent subsequent to Mar. 8, 2005 has been disclaimed.

[21] Appl. No.: 131,081

[22] Filed: Dec. 9, 1987

Related U.S. Application Data

[63] Continuation of Ser. No. 894,385, Aug. 7, 1986, Pat. No. 4,730,202.

[30] Foreign Application Priority Data

Feb. 6, 1984 [JP] Japan ................................. 59-204094
Feb. 6, 1984 [JP] Japan ................................. 59-20410
Oct. 9, 1984 [JP] Japan ................................. 59-213464

[51] Int. Cl.$^4$ .............................................. G03B 7/08
[52] U.S. Cl. .................................. 354/435; 354/436; 354/421; 354/443
[58] Field of Search ................ 354/412, 420, 421, 422, 354/423, 435, 436, 437, 440, 441, 442, 443, 21

[56] References Cited

U.S. PATENT DOCUMENTS

| | | | |
|---|---|---|---|
| 4,317,624 | 3/1982 | Shenk | 354/421 |
| 4,329,029 | 5/1982 | Haskell | 354/443 |
| 4,345,825 | 8/1982 | Matteson et al. | 354/421 |
| 4,354,748 | 10/1982 | Grimes et al. | 354/443 |
| 4,455,068 | 6/1984 | Izuhara | 354/412 |

Primary Examiner—Russell E. Adams
Attorney, Agent, or Firm—Jordan B. Bierman

[57] ABSTRACT

The present invention relates to the improvement of an exposure control device in a camera having a centralized control system that has a built-in control circuit such as a microprocessor etc. and employing a shutter wherein an optimum exposure is obtained in a way that the exposure is given to the film between the gradual opening of the shutter and the closing thereof and the correlation between the shutter apertures and their corresponding lapse of time form a triangle on the graph. If further relates to the improvement of the exposure control means for flash photographing in a camera employing aforesaid shutter and a built-in strobe flash light source.

12 Claims, 10 Drawing Sheets

BRIGHTNESS OF SUBJECT

START → RANGE-FINDING ACTION BY DEPRESSING 1ST STEP OF RELEASE
INTRODUCTION OF DISTANCE INFORMATION (MEMORY VALUE IN AF MODE)
→ START OF PHOTOMETRY (RELEASE OF SHORT OF TRANSISTOR 13)
→ MEASUREMENT OF TIME
→ COMPARING CIRCUIT 14 HAS OUTPUT BEEN INVERTED ? INVERSION
→ TIME MEASURED TO BE DECIDED
→ SUBJECT BRIGHTNESS/TIME MEASURED TABLE TO BE REFERRED
→ BRIGHTNESS OF SUBJECT TO BE DECIDED
→ FILM SPEED TO BE INTRODUCED STROBO FLASH INFORMATION TO BE INTRODUCED DISTANCE INFORMATION TO BE INTRODUCED (MEMORY VALUE IN AF MODE)
→ SUBJECT BRIGHTNESS/SHUTTER TIME/ STROBO FLASH TIMING TABLE
→ SHUTTER TIME FLASH TIMING TO BE STORED
→ HAS 2ND STEP OF RELEASE BEEN DEPRESSED ? NO/YES

→ EXPOSURE CONTROL (INCLUDING STROBO FLASH IF NECESSARY)
→ HAS EXPOSURE CONTROL BEEN FINISHED ? NO/YES
→ FILM WINDING SHUTTER CHARGE
→ END

FIG. 10(a)

"SMALL APERTURE-PRIORITY"

FIG. 10(b)

"IMPROVED FLASH TIMING"

CAMERA

This is a continuation, of Ser. No. 894,385 filed Aug. 7, 1986, now U.S. Pat. No. 4,730,202.

BACKGROUND OF THE INVENTION

1. Field of the Invention

The present invention relates to the improvement of an exposure control means in a camera having a centralized control system that has a built-in control circuit such as a microprocessor etc. and employing a shutter wherein an optimum exposure is obtained in a way that the exposure is given to the film between the gradual opening of the shutter and closing thereof and the correlations between the shutter apertures and their corresponding lapse of time form a triangle on the graph. If further relates to the improvement of the exposure control means for flash photographing in a camera employing aforesaid shutter and a built-in strobe flash light source.

2. Description of the Prior Art

With the spread of electronics used in a camera, various functions of a camera have been diversified with their performance improved. While, the shutter that is a basis of an exposure control is still continuing its conventional construction and no remarkable progress has been observed in particular. The majority of the program control shutter which is a shutter-cum-diaphragm for the present small-sized camera is the one wherein the gradual opening of the shutter gives an exposure to the film and the closing thereof gives an optimum exposure and the correlations between the shutter apertures and their corresponding lapse of time form a triangle on the graph. The shutters of such type as disclosed in Japanese Patent Examined Publication Nos. 18111/1971 and 11947/1969 for example.

In the technology of aforesaid shutter, the capacitor is charged with photoelectric current from the light-responsive element from the moment of the start of shutter opening and then the shutter closing is performed when the voltage charged in the capacitor reaches a certain level of voltage, namely, when the optimum exposure is given to the film. This system is publicly known and therefore the detailed description thereof will not be made here but it has demerits on the points of characteristics of light-responsive element and complicated mechanical structure of the shutter, as itemized below.

(1) When CdS is used as a light-responsive elements, the $\gamma$ value that represents the relation between the quantity of light and the resistance value for CdS needs to be 0.5.

(2) There is a limitation for the opening speed of the shutter.

Despite the spread of electronics in a camera mentioned above, the shutter itself still consists obstinately of mechanical factors which have have prevented the simplification of camera structure.

On the other hand, an aperture value F that gives an optimum exposure in flash photographing is obtained, as is generally known, from the equation of $F = GNO/L$, where "GNO" is a guide number of a strobe flash and "L" is a subject distance. Following two ways have been known as an application of the equation.

(1) An aperture is to be changed according to the subject distance. Namely, it is a method of so-called flash-matic mechanism wherein an aperture diameter is changed being interlocked with the turning of a focusing ring.

(2) A method that employs a shutter-cum-stop and causes a strobe flash to emit light during the course of gradual opening of the shutter ranging from the closing to the opening thereof and changes its emission timing according to the subject distance. The former method makes it very difficult to photograph using a DX film and it is actually impossible to incorporate into a small-sized camera the flash-matric mechanism that makes the photographing on the DX film possible, which is a demerit. The mechanism that detects the ISO speed from the DX film and changes the stop value through the mechanical driving thereof using the electric signal converted from the ISO speed detected requires electro-magnetic devices such as a motor, a magnet and others as a driving source and thereby it is actually difficult to incorporate such mechanism into a small-sized camera.

Since the control of emission timing for strobe flash is made electrically in the method of (2), it is easy to introduce the information of ISO speed obtained from a DX film into the control system and therefore the method (2) is suitable for the use of DX films.

Figure 1A:
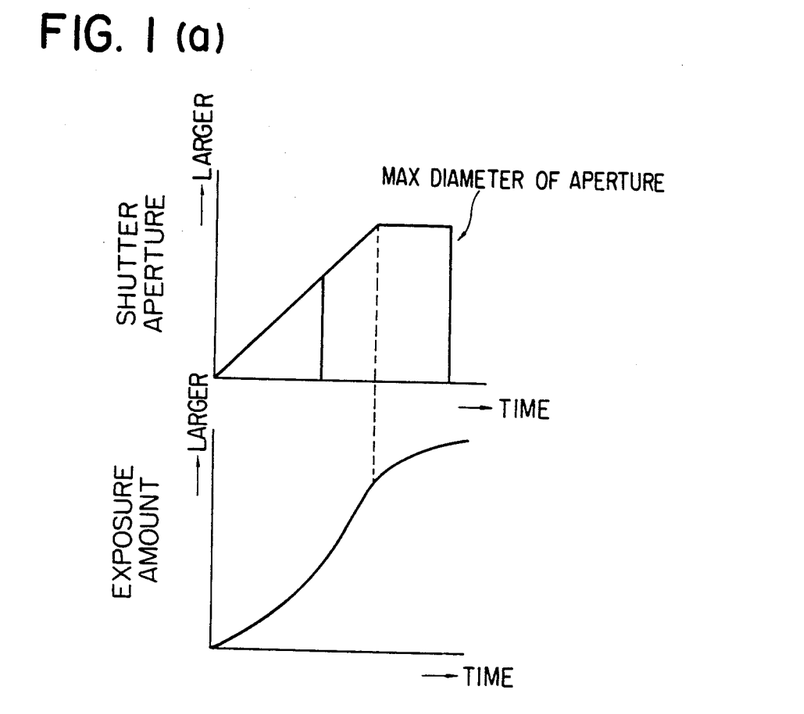
FIG. 1(a) and (b) show the relational characteristic between the shutter and the quantity of the exposure.
Figure 1B:
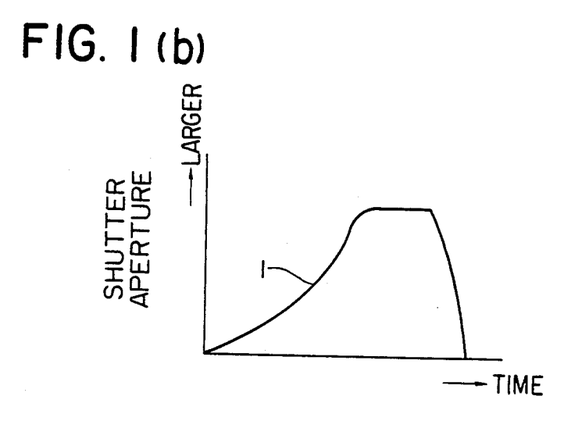

However, the following problem is caused by the application of the method (2) to a camera. An emission timing of the strobe flash may be obtained through the calculation that employs the aforesaid equation and the correlation between the shutter aperture and time shown in FIG. 1. Heretofore, the calculation has been performed for the determination of the emission timing of the strobe flash under the assumption that the shutter aperture changes linearly and ideally with the lapse of time as shown in FIG. 1.

However, it is impossible for the actual shutter to have such an ideal aperture characteristic. It is known that the serious nonlinearity in the aperture characteristic is caused by the type of shutter mechanism employed or the like and it has become clear that the emission timing obtained from the simple calculation like the one explained above can not provide an optimum exposure due to the aforesaid nonlinearity.

OBJECTS AND SUMMARY OF THE INVENTION

An object of the present invention is to provide, using the technology of integrated circuit such as a microcomputer or the like, a simplified expose control means for camera, especially to provide an exposure control means satisfying the following.

(1) Simplification of mechanical structure of the shutter (2) To remove the restriction for the selection of light-responsive elements and photometry circuits (3) Introduction of film speed and simplification of exposure control affected by the change in film-speed The present invention has been devised in due consideration of the problems in the prior art explained above and its object is to provide an exposure control means for artificial light that provides an optimum exposure with a small error in exposure in the flash photographing when the aforesaid method (2) is applied to a camera.

The present invention is to provide a camera comprising:

a photometry means that measures the brightness of a subject and produces the measurement results as a subject brightness information;

a shutter device the aperture of which gradually opens from the closed-shutter condition to the full-open condition and then changes to the closing operation with a shutter-closing signal; and an exposure control means that receives at least aforesaid subject brightness information and controls the operation of aforesaid shutter device based on said subject brightness information; wherein, aforesaid exposure control means has a memory means wherein the classification of subject and timing information for the shutter-closing instruction for each class of subject brightness are stored in the form of a table and a timing information for the shutter-closing instruction corresponding to the subject brightness information inputted is selected from said table for the exposure. Further, the present invention is to provide a camera comprising:

a film speed setting means that produces the speed information of the film loaded in the camera;

a strobe flash emission device; and a judgement means that judges whether the strobe flash emission device is operated or not; wherein, said camera has a memory means wherein a table corresponding to the foregoing is stored and the timing information for the shutter-closing instruction based on the information of the foregoing and/or the emission timing for the strobe flash emission device are selected from aforesaid table.

DESCRIPTION OF THE PREFERRED EMBODIMENTS

As explained above, the aperture characteristic of the shutter for the lapse of time in a diaphragm-shutter is not a straight line in FIG. 1 but is a curved line deviated from the straight line as shown as "l" in FIG. 1'.

Regarding the aperture characteristic, however, its dispersion among shutters is small and in the case of a shutter of a particular type based on a peculiar design, the dispersion of the characteristic among shutters is small, owing partly to the quality control for mass production, thus stable characteristics may be obtained. Mass measurement of the shutters in the example explained later offered a measured value of 20 ms±2 ms as a dispersion in the time required by the shutter to open to the maximum aperture diameter and the dispersion in exposure quantity caused by the aforesaid dispersion in the time is sufficiently within the latitude of the film and therefore is allowable.

If the stability in the time-wise characteristic of the shutter aperture opening is used, it is possible to obtain the time ranging from the start of shutter opening to the start of shutter closing (hereinafter referred to as the shutter time) necessary for giving an optimum exposure to the film for each subject brightness as a common data for aforesaid shutter of peculiar type. Following Table 1 shows the correlation between the brightness of a subject nd the shutter time both obtained experimentally.

In the present example, the exposure control range covers from EV 8.5 to EV 16 in terms of subject brightness and all EV values from EV 8.5 to EV 16 with a step of 0.5 EV and their corresponding shutter time are stored under the basis of the unit of APEX (Additive system of Photographic Exposure) system. However, the exposure control range and the width of a step may freely be established. In the table, the maximum shutter time is limited up to 20 ms for the prevention of unintentional movement of the hands in photographing and is limited down to 2.6 ms, on the other hand, because it is difficult to control the minimum shutter aperture corresponding to the shutter time of 2.6 ms or less.

TABLE 1

| Subject Brightness and Shutter Time | | | | |
|---|---|---|---|---|
| subject brightness | | film speed | | |
| EV | zone | ISO 100 | ISO 200 | ISO 400 |
| 16 | 0 | 2.6 ms | 2.6 ms | 2.6 ms |
|  | 1 | 3.3 | 2.6 | 2.6 |
| 15 | 2 | 3.8 | 2.6 | 2.6 |
|  | 3 | 4.6 | 3.3 | 2.6 |
| 14 | 4 | 5.0 | 3.8 | 2.6 |
|  | 5 | 6.0 | 4.6 | 3.3 |
| 13 | 6 | 6.8 | 5.0 | 3.8 |
|  | 7 | 7.8 | 6.0 | 4.6 |
| 12 | 8 | 8.8 | 6.8 | 5.0 |
|  | 9 | 11.5 | 7.8 | 6.0 |
| 11 | 10 | 15.2 | 8.8 | 6.8 |
|  | 11 | 20.0 | 11.5 | 7.8 |
| 10 | 12 | 20.0 | 15.2 | 8.8 |
|  | 13 | 20.0 | 20.0 | 11.5 |
| 9 | 14 | 20.0 | 20.0 | 15.2 |
|  | 15 | 20.0 | 20.0 | 20.0 |

Figure 2A:
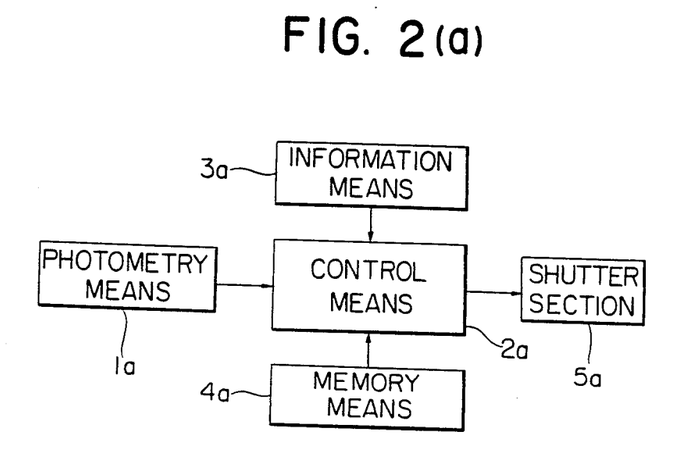
FIG. 2(a) and (b) show the basic block diagram of the present invention.

FIG. 2a shows a block diagram representing the actions of the camera of the present invention wherein the action of the shutter device is controlled by the subject brightness information obtained by the photometry means.

The photometry means 1a detects the brightness of subject through the light-responsive element and sends the brightness information to the control means 2a.

The information means 3a sends the information of the film speed and others to the control means 2.

The memory means 4a wherein the shutter aperture characteristics shown in the above table is already stored.

The control means 2a determines, through the selection from the memory means 4a or the selection processing therefrom, the shutter time necessary for giving the optimum exposure to the film based on the values from the photometry means 1a and the information means 3a.

As stated above, the shutter time is stored temporarily in the control means 2a and these stored values control the shutter section 5a when the exposure control is performed later, thus photographing is made.

Though the exposure control means is divided into the aforesaid blocks for the purpose of clear explanation, it is possible to combine the blocks into one IC using the integrated circuit and the microcomputer makes the merits of the present invention notable, in particular.

Figure 2B:
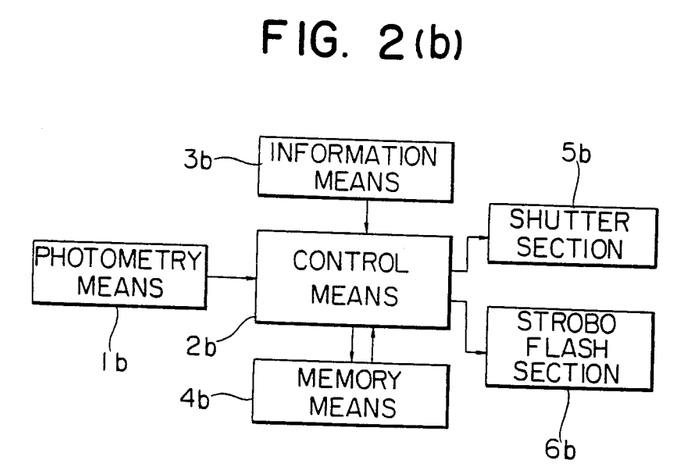

FIG. 2(b) is a block diagram of the actions of the camera of the present invention having the photometry means and strobe flash device wherein the strobe flash emission is made concurrently with the operation of the shutter device.

The photometry means 1b detects, through its light-responsive element, the subject brightness and sends the brightness information to the control means 2b.

The information means 3b sends the information such as the film speed, the use of strobe flash and others to the control means 2b.

The memory means 4b stores the shutter aperture characteristic shown in the aforesaid table. The Table 2 shown below indicates the shutter time stored in the memory means 4b and the generation timing for trigger signals of strobe flash. The data in Table 2 were not obtained from relational expressions that gives an optimum exposure concerning the parameters such as subject brightness, diaphragm, shutter time, subject distance, guide number and film speed etc. both for AE and the use of strobe flash but were obtained from the results of measurement on the shutters actually prepared.

The control means 2b determines, through the performance of selection or selection processing from the memory means 4b, the shutter time necessary for giving an optimum exposure to the film based on the values from the photometry means 1b and the information means 3b.

As stated above, the shutter time is provisionally stored in the control means 2b and later when the exposure control is made, the storage value controls the shutter section 5b, thus photographing is performed.

Therefore, it is difficult for the conventional mechanical emission means for artificial light to emit the light while the shutter is opening but it is possible for the method of the present invention to set the emission which may be made at an arbitrary aperture diameter during the shutter-opening. Namely, when the strobe flash is used as an auxiliary light, it is possible to set relatively freely the ratio of the natural light quantity to the auxiliary light quantity and thus it is possible to photograph for photographs of good quality.

TABLE 2

Photometry Zone Value and Shutter Time (unit: m sec)

| subject brightness | | ISO 100 | | | ISO 200 | | | ISO 400 | | |
|---|---|---|---|---|---|---|---|---|---|---|
| | | | strobe flash is used | | | strobe flash is used | | | strobe flash is used | |
| EV | zone | AE | AF short | AF long | AE | AF short | AF long | AE | AF short | AF long |
| 16 | 0 | 2.6 | 2.6 | 2.6 | 2.6 | 2.6 | 2.6 | 2.6 | 2.6 | 2.6 |
| | 1 | 3.3 | 3.3 | 3.3 | 2.6 | 2.6 | 2.6 | 2.6 | 2.6 | 2.6 |
| 15 | 2 | 3.8 | 3.8 | 3.8 | 2.6 | 2.6 | 2.6 | 2.6 | 2.6 | 2.6 |
| | 3 | 4.6 | 4.6 | 4.6 | 3.3 | 3.3 | 3.3 | 2.6 | 2.6 | 2.6 |
| 14 | 4 | 5.0 | 5.0 | 5.0 | 3.8 | 3.8 | 3.8 | 2.6 | 2.6 | 2.6 |
| | 5 | 6.0 | 6.0 | 6.0 | 4.6 | 4.6 | 4.6 | 3.3 | 3.3 | 3.3 |
| 13 | 6 | 6.8 | 6.8 | 6.8 | 5.0 | 4.6 | 5.0 | 3.8 | 3.3 | 3.8 |
| | 7 | 7.8 | 6.8 | 7.8 | 6.0 | 4.6 | 6.0 | 4.6 | 3.3 | 4.6 |
| 12 | 8 | 8.8 | 6.8 | 8.8 | 6.8 | 4.6 | 6.8 | 5.0 | 3.3 | 5.0 |
| | 9 | 11.5 | 6.8 | 11.5 | 7.8 | 4.6 | 7.8 | 6.0 | 3.3 | 6.0 |
| 11 | 10 | 15.2 | 6.8 | 15.2 | 8.8 | 4.6 | 8.8 | 6.8 | 3.3 | 6.8 |
| | 11 | 20.0 | 6.8 | 20.0 | 11.5 | 4.6 | 11.5 | 7.8 | 3.3 | 6.8 |
| 10 | 12 | 20.0 | 6.8 | 20.0 | 15.2 | 4.6 | 15.2 | 8.8 | 3.3 | 6.8 |
| | 13 | 20.0 | 6.8 | 20.0 | 20.0 | 4.6 | 20.0 | 11.5 | 3.3 | 6.8 |
| 9 | 14 | 20.0 | 6.8 | 20.0 | 20.0 | 4.6 | 20.0 | 15.2 | 3.3 | 6.8 |
| | 15 | 20.0 | 6.8 | 20.0 | 20.0 | 4.6 | 20.0 | 20.0 | 3.3 | 6.8 |

Now, the light-responsive element to be used in the present invention and the exposure control by means of the information obtained by the photometry means will be explained in detail.

Figure 3:
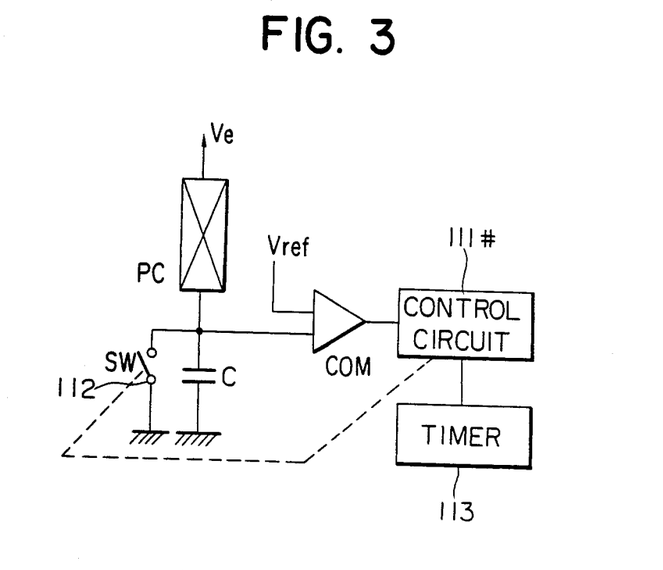
FIG. 3 and FIGS. 5(a) and (b) are the circuit diagram of the exposure control device of the present invention.

FIG. 3 is an explanatory circuit diagram showing the principle of the photometry means wherein the current corresponding to the quantity of light received by the light-responsive element or the light-responsive element unit marked as PC in the diagram is stored in the capacitor C from the moment of the start of photometry (switch SW OFF) and then the voltage of the capacitor C is compared with a reference voltage Vref by the comparator COM, thus the time ranging from the start of photometry up to the moment when the capacitor voltage becomes equal to the reference voltage Vref is measured. The time is actually counted buy the timer 113 whose counting is started with the timing of "OFF" action of the switch SW and completed when the voltage of the capacitor C is equalized with the standard voltage. In the control circuit, on the other hand, the correlation between the various quantity of light received by the light-responsive element PC and various time periods measured in the aforesaid manner is stored in advance and thereby the quantity of the light may be obtained. The foregoing is a function of the exposure control means for camera of the present invention.

The circuit in FIG. 3 may be applied intact to the example employing the microprocessor (hereinafter referred to as "micom") wherein a transistor, CdS and a timer are built as the switch SW, the light-responsive element PC and a control circuit respectively. Namely, the light-responsive element CdS and the integrating capacitor C are connected in series and the integrating capacitor C and the switching transistor 112 are connected in parallel. If the switching transistor is turned on prior to the photometry, the capacitor C is discharged and its voltage goes down to zero. Next, if the switching transistor 112 is turned off, the capacitor is charged from CdS at the speed corresponding to the subject brightness and thereby the voltage at the capacitor goes up. Namely, the photometry is started. The voltage of the capacitor is compared with the standard value Vref by the comparison circuit COM and the comparison output therefrom is inputted in the micom which is a control circuit Based on this inputted signal, the micom detects, through its built-in timer, the time period from the start of the photometry to the moment when the output from aforesaid comparison circuit COM tells that the voltage of the capacitor has been equalized with the standard value Vref.

With power source voltage Ve, reference voltage Vref, resistance value of CdS Rcds and capacity of integrating capacitor C, the time T (that is called the photometry time) ranging from the transistor 112 being opened up to the moment of reaching the reference value is:

$$T = CRcds \ln \frac{Ve - Vref}{Ve}$$

and further, if Vref is determined through the resistive dividing, $$T = CRcds \ln (1-k)$$

thus, the photometry time is independent of the power source voltage and is determined only by the resistance of CdS, the capacity of capacitor and the resistive dividing ratio.

Figure 4:
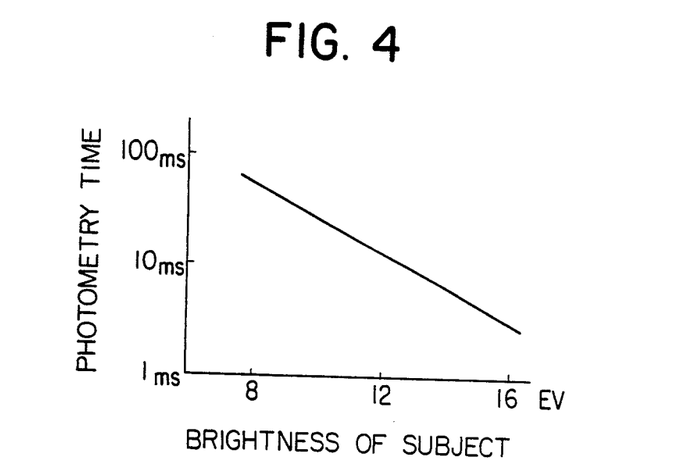

Since the resistance of CdS is determined by the quantity of light received, the brightness of the subject is obtained by detecting the photometry time T. Namely, the correlation between the quantity of light and the photometry time is stored in the Micro Processor Unit (hereinafter referred to as MPU) 111 in advance and the brightness of the subject can be obtained by selecting the memory value using the photometry time. The correlation between the brightness of the subject and the photometry time obtained experimentally in the present example is shown in FIG. 4 and Table 3 shows the example of the memory in which the correlation between the photometry time $T_1$ and the brightness of the subject corresponding to the photometry time is stored in the MPU 111 with an interval of ⅛EV step, and the interval of the step can freely be established.

TABLE 3

| | Subject Brightness and Photometry Time | |
|---|---|---|
| zone | $T_1$ (ms) | brightness of subject (EV) |
| 0 | −4.8 | −15¾ |
| 1 | 4.8–5.7 | 15¾–15¼ |
| 2 | 5.7–6.8 | 15¼–14¾ |
| 3 | 6.8–8.0 | 14¾–14¼ |
| 4 | 8.0–9.5 | 14¼–13¾ |
| 5 | 9.5–11.2 | 13¾–13¼ |
| 6 | 11.2–13.8 | 13¼–12¾ |
| 7 | 13.8–16.5 | 12¾–12¼ |
| 8 | 16.5–20.0 | 12¼–11¾ |
| 9 | 20.0–24.5 | 11¾–11¼ |
| 10 | 24.5–30.0 | 11¼–10¾ |
| 11 | 30.0–37.0 | 10¾–10¼ |
| 12 | 37.0–45.0 | 10¼–9¾ |
| 13 | 45.0–55.0 | 9¾–9¼ |
| 14 | 55.0–66.0 | 9¼–8¾ |
| 15 | 66.0– | 8¾–8¼ |

The merits of the exposure control means explained above are listed below.

(1) The γ value of CdS needs not be specified.

(2) The resistance value of CdS corresponding to a certain quantity of light can easily be corrected with the use of the resistive dividing ratio.

(3) The circuit construction is simple.

(4) The exposure control means is not power source voltage-dependent.

On the other hand, the demerit is that the dispersion in the γ value of CdS affects the exposure control means. But the dispersion is in the level negligible for photographing, therefore it is not essentially a problem.

Figure 5A:
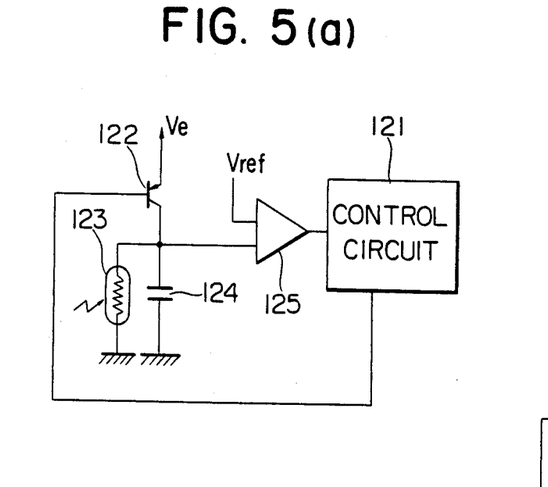
Figure 6:
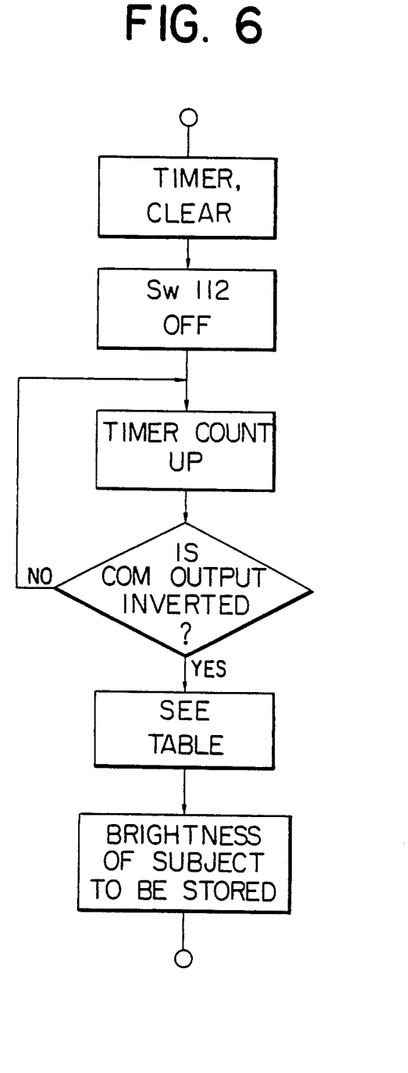
FIG. 6 shows an operation program of the exposure control circuit of the present invention.

Though the charging time for the capacitor is measured in the example explained above, the brightness of the subject may also be obtained in the manner wherein the capacitor is charged in advance, the charging is stopped and discharging through the light-responsive element is started concurrently with the start of photometry, the time required for discharging down to the reference voltage is measured and then the measured time is compared with the memory value of subject brightness and discharging time stored in the control circuit. The circuit diagram of this example is shown in FIG. 5(a) in which the numeral 121 is a control circuit employing MPU, 122 is a transistor that stops the charging concurrently with the start of photometry, 123 is a light-responsive element CdS, 124 is a capacitor and 125 is a comparison circuit that compares the voltage after discharging in the capacitor 124 with the reference voltage Vref. The MPUs 111 and 121 of the exposure control means shown in FIG. 3 and FIG. 5(a) respectively operate according to the program shown in FIG. 6.

Figure 5B:
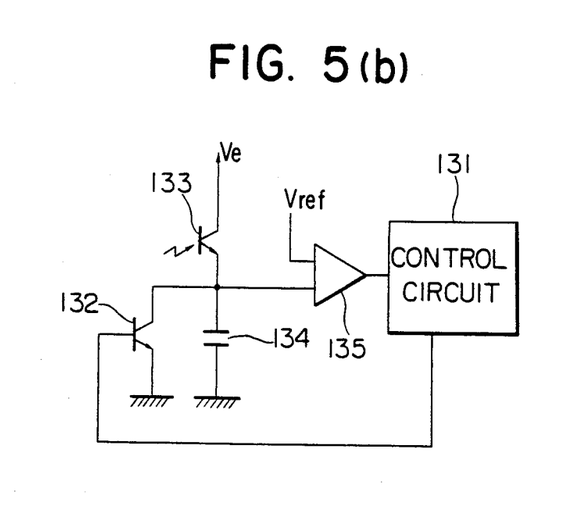

Further, FIG. 5(b) shows an example of the circuit in which the light-responsive element other than CdS such as photo diode, photo transistor or selenium element etc. is used. In this circuit, the photo-electric current that flows through the photo transistor 133 is stored in the capacitor 134 thereby the exposure control is similarly attained. In this case, however, it is naturally possible to organize an exposure control means with a light-responsive unit wherein the function such as the improvement in characteristics against temperature of the light-responsive element or the amplification of photo-electric current is added by providing at need the circuit that converts or amplifies signals of the current and voltage etc. generated in the light-responsive element, in addition to the function that the light-responsive element itself generates only photo-electric current.

In each example mentioned above, the comparison circuit is especially used to serve the convenience of explanation but when the transistor is used in the input step of the control circuit, it is possible to simplify the circuit construction by using the base emitter voltage of the transistor. Likewise, also in the case when a C-MOS circuit is used as an input step of the control circuit, the threshold voltage of the C-MOS may be utilized.

Regarding the exposure control means and the photometry means both relating to the present invention, an explanation has been made above individually focusing on Tables 1, 2 and 3. However, it may be clear for those skilled in the art that all of Tables 1, 2 and 3 do not necessarily need to be stored. Namely, if the table showing the relation between the classification of the photometry time {corresponding to $T_1$ (ms) in Table 3} corresponding to the classification of the subject brightness and the shutter time {corresponding to the shutter time (ms) in Tables 1 and 2} corresponding to aforesaid photometry time only is stored, the timing information for the shutter-closing instruction corresponding to the subject brightness information (i.e. aforesaid photometry time) obtained by the photometry means can be obtained from the table.

Figure 7:
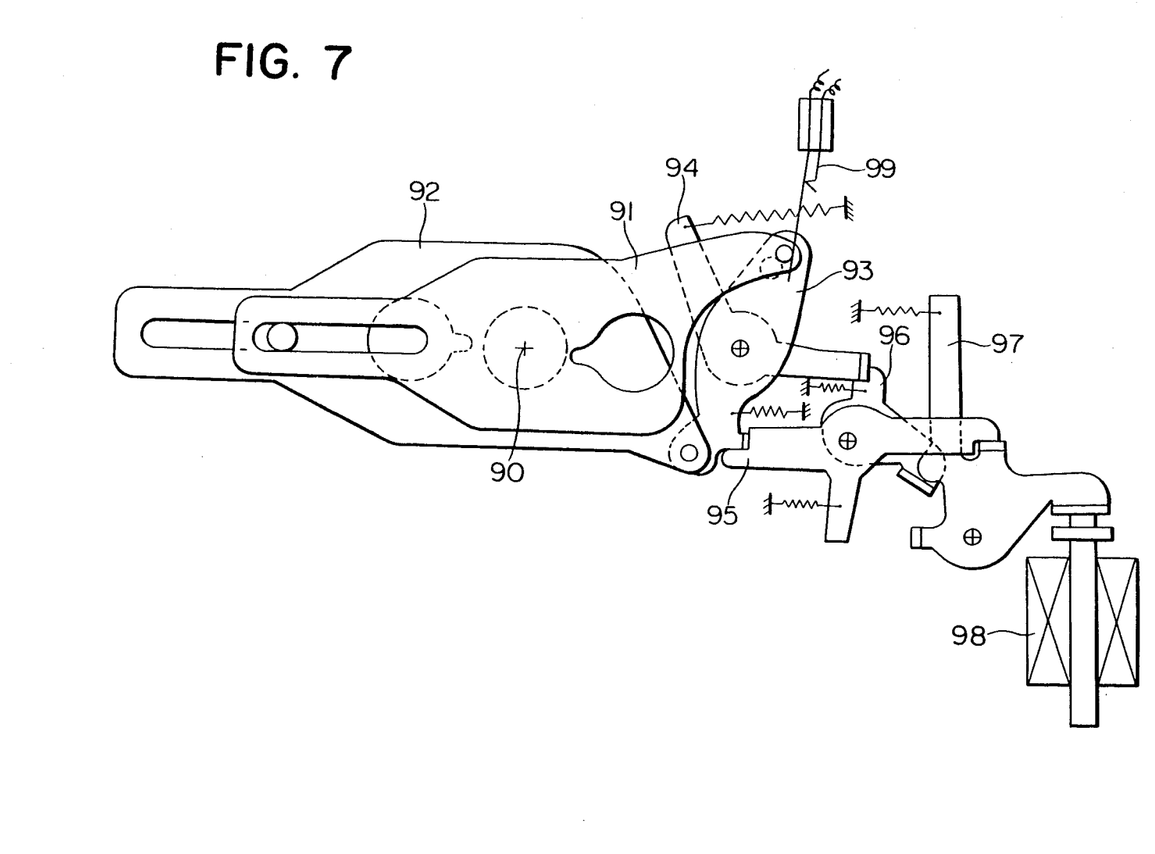
FIG. 7 is a plane view of the shutter mechanism section of the present invention, FIGS. 8(a) and (b) are the circuit diagram for the main part of the example of the present invention, FIGS. 9(a) and (b) show a flow chart of the present invention

The embodiment of the present invention will be explained next. The embodiment was embodied in the lens shutter which uses 135 film and a plane view of the example of shutter mechanism section is shown in FIG. 7 and a circuit diagram of main parts of the example of the camera that controls an exposure using the information obtained from the photometry means is shown in FIG. 8(a).

Figure 8A:
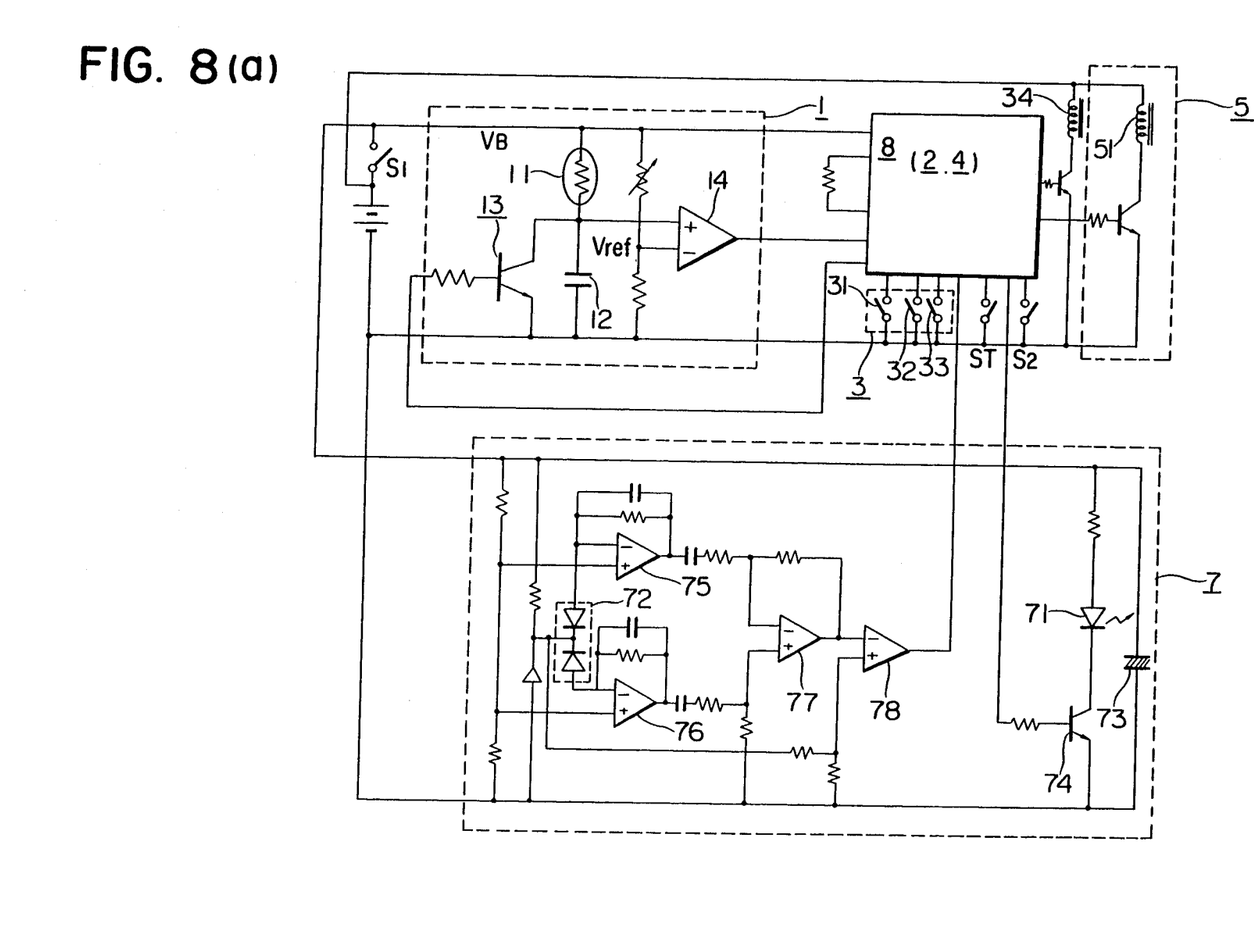

In FIG. 8(a), when the first step $S_1$ of the release switch in 2-step construction is depressed, the entire circuit is energized, the MPU 8 starts operating and an automatic focusing detection (AF) is first performed. The AF system of the present invention is performed through the range-finding circuit 7 in which the infrared LED 71 is caused to emit light and the infrared reflected light on the subject is received by the position sensitive element 72 for range-finding. The position sensitive element 72 is composed of two light-responsive elements which produce different current each other depending on the different quantity of light received. These currents are amplified by the AC amplification circuit 75 and 76 respectively and then the result therefrom is compared with an electric signal corresponding to a certain distance between a subject and a camera where the currents from the two light-responsive elements are equal, thus the distance information is obtained.

Then, the MPU 8 measures the brightness of the subject through the photometry means 1 explained earlier.

Now, the information of the film speed switches 32 and 33 located in the information means 3 are introduced into the MPU 8. In the present example, the film speed can be selected by the MPU with the use of 2-bit signal because the film speed is limited to 3 kinds of ISO 100, ISO 200 and ISO 400. Incidentally, the following was set up.

"0" signal on switch 32 and "0" signal on switch 33 for ISO 100

"0" signal on switch 32 and "1" signal on switch 33 for ISO 200

"1" signal on switch 32 and "1" signal on switch 33 for ISO 400

With all the information necessary for determining the shutter time introduced as stated above, the MPU 8 determines the shutter time according to the aforesaid table. Then, if the second step of the release switch is not depressed for some reason, the cycle returns to the photometry step again. Aforesaid operation steps of the MPU are shown as the schematic flow chart in FIG. 9(a).

Figure 9A:
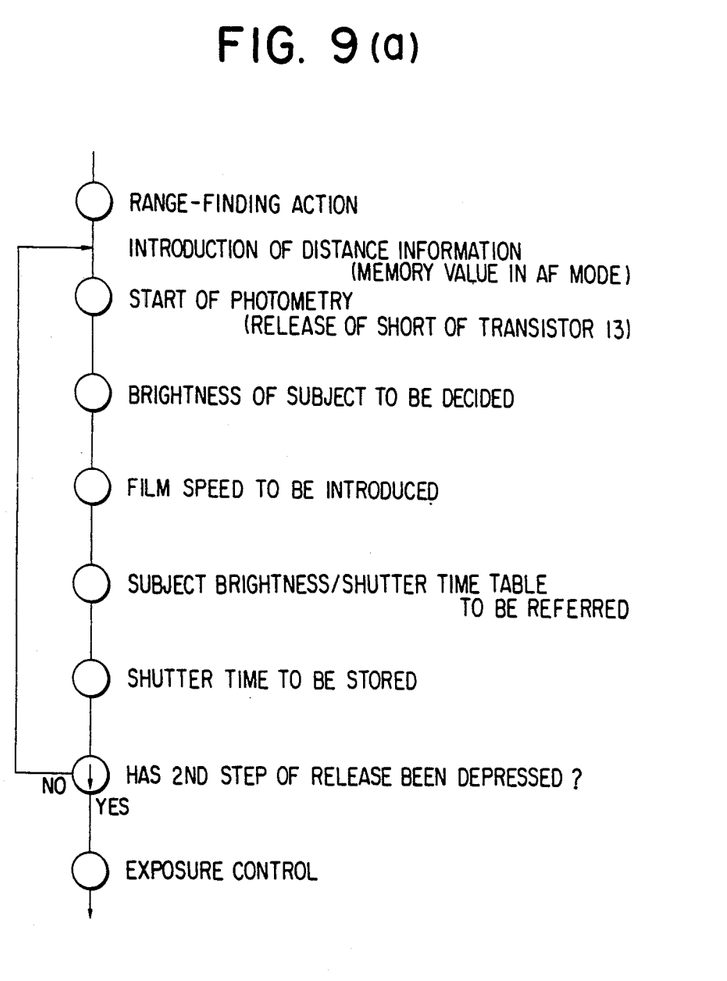

The method of Table 1-consultation for the selection of shutter time in the schematic flow chart is easy for those skilled in the art to conduct and following is a brief explanation of one example. The contents of the table of shutter time data mentioned above are stored in succession in the memory addresses on the Read-Only-Memory located in the MPU 8 and then the range of memory addresses for data selection is limited first to some degree according to the film speed information and thus the first or the last memory address in the range is determined. After that, the brightness of the subject selects the particular data address located with a certain distance from the first or the last memory address.

Following the first step of the release switch depressed, if $S_2$ which is the second step of the release switch is depressed and thereby $S_2$ is closed electrically and the exposure-control-start-signal is produced, the MPU 8 first energizes the shutter magnet 51 and then energizes AF magnet 34 based on the value stored after the range finding made by the AF circuit 7 and causes the photographing lens to rotate toward the focusing position, and after it has rotated and moved to the prescribed position, the MPU 8 stops energizing AM magnet 31 and the lever that turns the shutter-locking member being affected by the rotation of the lens moves, which means that the shutter-locking member is released only after the photographing lens has been fixed.

Now, the mechanism and operation of exposure control will be explained referring to FIG. 7. The numeral 90 in the figure shows the optical axis of the photographing lens, 91 and 92 are the shutter blades A and B performing the opening and closing of shutter aperture and the figure shows the situation of closed sutter and shutter opening is performed when the shutter blade A91 is moved toward left and at the same time the shutter blade B92 is moved toward right. In the structure of the exposure control, the shutter opening is performed by the shutter blade lever 93 rotating counterclockwise.

As stated above, if the release lever 95 which is a shutter-locking member is released to turn counterclockwise, the shutter blade lever 93 rotates counterclockwise and at the same time the shutter blade A91 interlocking with the shutter blade lever 93 and the shutter blade B92 move toward the shutter opening. Then, the shutter-trigger switch 99 {corresponding to ST in FIG. 8(a)} that is preset so that it is turned OFF when the shutter forms a pinhole aperture is actuated.

The MPU 8, on the other hand, keeps detecting the shutter-trigger-switch 99 to be turned OFF and if it detects the OFF, it calculates the shutter time based on the data selected or selection-processed from the Table 1.

At the moment when the release lever 95 is released, the shutter-magnet 98 {corresponding to 51 in FIG. 8(a)} is already under the electrified condition and thereby the magnet lever 97 is prevented by the magnetic force from rotating. Under such condition, the shutter keeps opening its aperture until the MPU 8 finishes its calculation of the shutter time. Then, concurrently with the completion of shutter time calculation, the MPU 8 stops electrifying the shutter magnet 98. With a disappearance of the magnetic force of the shutter magnet 98, the magnet lever 97 is rotated counterclockwise by the spring force and thereby the shutter-closing-lever-hook 96 is rotated clockwise. Then, the shutter-closing-lever 94 which has been locked by the shutter-closing-lever-hook 96 rotates clockwise and at the same time causes the shutter blade lever 93 to rotate clockwise opposite to the direction of shutter opening, thus the shutter is caused to close and an exposure is completed.

The mechanism section which has completed the aforesaid shutter operation turns the magnet lever 97 clockwise through the other charging member (not shown) and causes it to be hooked by the release lever 95. After that, the mechanism section turns the shutter-closing lever 94 counterclockwise and causes it to be hooked by the shutter-closing-leveer-hook 96, thus the shutter-charging is completed.

Figure 8B:
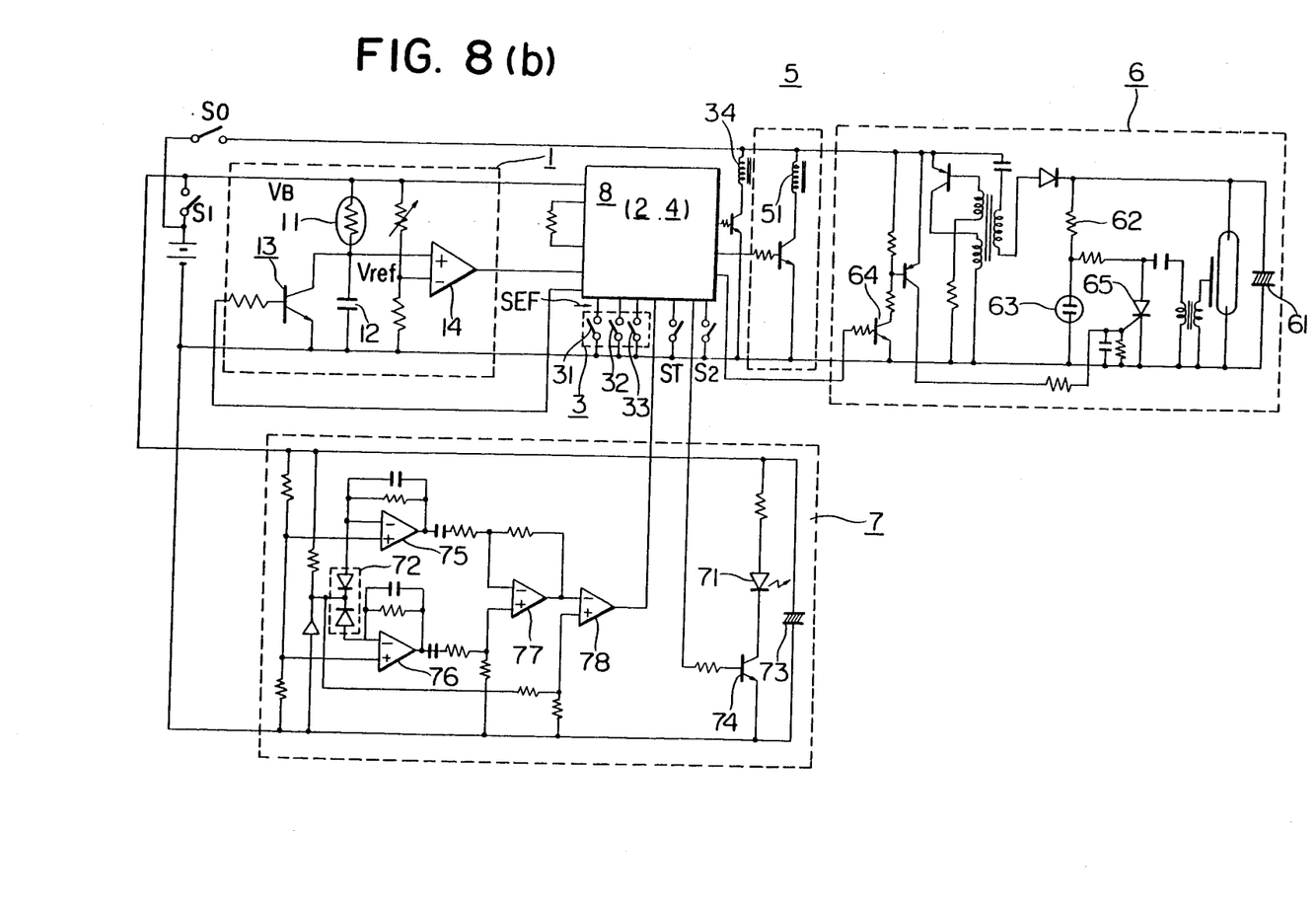

A concrete example of the camera having the photometry means and the strobe flash device and strobe emission is made concurrently with an operation of the shutter device in said camera of the present invention will be explained as follows. The example was embodied in the lens shutter in which a 135 film is used and the shutter mechanism section is identical to FIG. 7 explained already and FIG. 8(b) shows a circuit diagram for the main section of the example.

When a strobe flash is used for photographing, the power switch So for strobe flsh is turned ON and thus the strobe flash circuit 6 is electrified and the strobe flash capacitor 61 is charged by the voltage boosted up to about 300 V. After the capacitor has been charged, the neon tube 63 is lit through the resistance 62, which indicates that the preparation for strobe flash has been finished. At this point, the switch 31 in the information means 3 that opens or closes concurrently with the switch So is also turned ON and thereby the information of the switch 31 for strobe flash are set in the MPU 8 provided with both the control means 2 and the memory means 3.

Then, if the first step $S_1$ of the release switch which is of a two-step structure is pressed, the entire circuit is electrified and thereby the MPU 8 starts operating and performs first the automatic focusing (AF). An AF of the present example is performed through the photometry circuit 7 in which the infrared LED 71 is caused to emit and then the infrared reflected light from the subject is received by the position-detecting element 72 for range-finding. While the MPU 8 waits for the infrared emission capacitor 73 to be charged and when the charging has been mostly finished, the infrared emission transistor 74 is closed electrically by the MPU 8 and thereby the infrared emission capacitor 73 is discharged and the infrared LED 71 is lit. Infrared rays emitted reflect on the subject and then received by the position-detecting element 72 which is composed of two light-responsive elements and the current running through each light-responsive element differs each other depending upon the quantity of light received by each element. These currents are amplified respectively by AC amplifying circuits 75 and 76 and then are compared in the comparison circuit 78 with the electric signal for the standard distance which is a switching point between long and short distances and thus the distance information may be obtained.

The distance information which is an output signal from the comparison circuit 78 is inputted into the MPU 8 and the best timing for the MPU 8 to receive this input signal in the present example is about $100\mu$ sec after the infrared emission. The distance information received in the aforesaid timing is stored in the MPU 8.

Next, the MPU 8 measures the subject brightness through the photometry means 1 explained already.

Now, the MPU 8 introduces the information of film speed switches 32 and 33 located in the information means 3. In the present example, the film speed information is read from the film container of a DX type, namely, the film container of a DX type is mounted on a camera and the film speed information is automatically read for each photographing action. In the present example, the type of film to be used is limited to three kinds of ISO 100, ISO 200 and ISO 400 and therefore each film speed can be selected by the MPU using a two-bit signal. Incidentally, the following was set up.

"1" signal on switch 32 and "0" signal on switch 33 for ISO 100

"0" signal on switch 32 and "0" signal on switch 33 for ISO 200

"1" signal on switch 32 and "1" signal on switch 33 for ISO 400

Figure 9B:
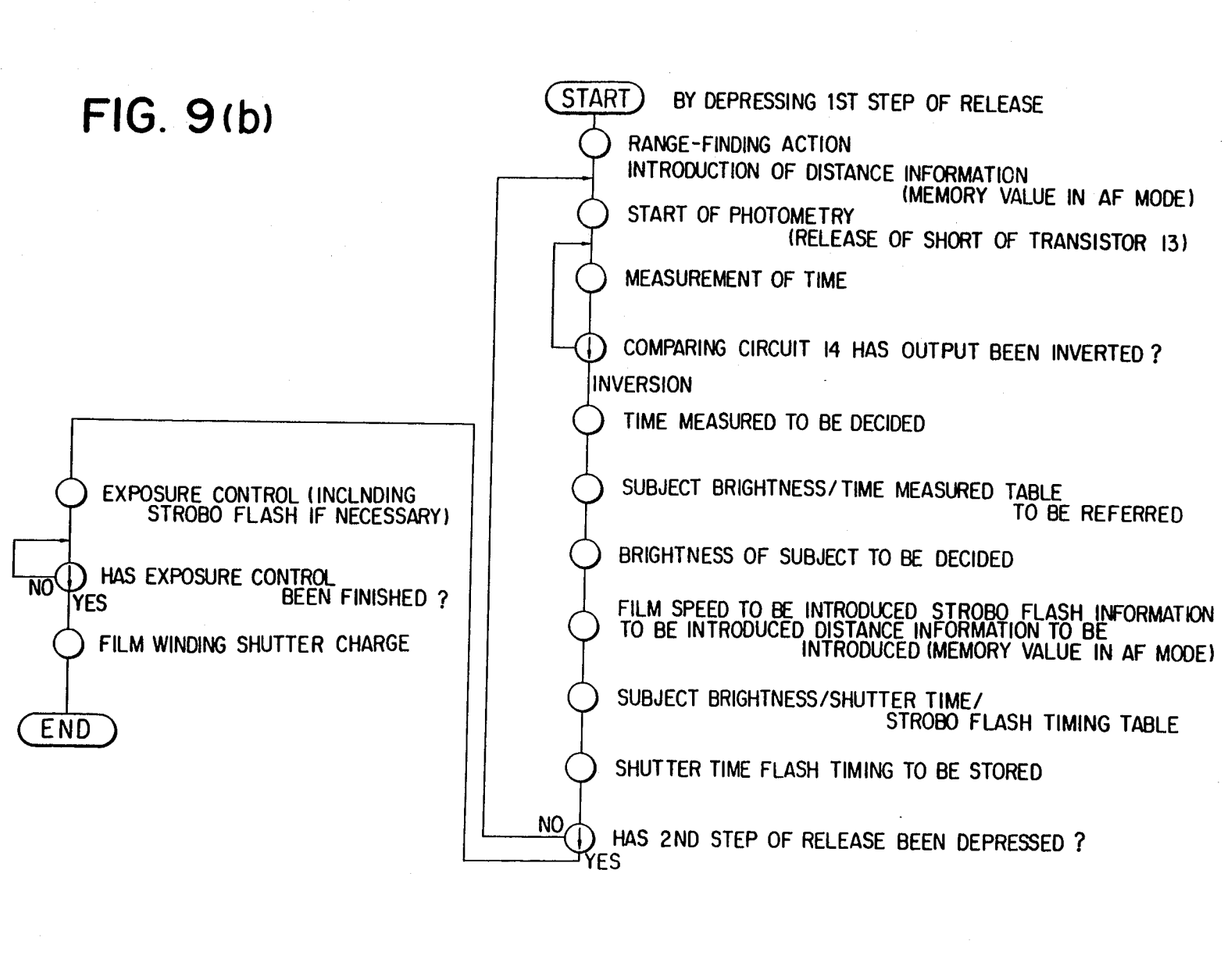

With all the information necessary for determining the shutter time introduced as stated above, the MPU 8 determines the shutter time and emission timing for strobe flash according to the aforesaid table. Then, if the second step of the release switch has been pressed, the MPU 8 performs exposure control and if it has not been pressed, the cycle returns to the photometry step again. Aforesaid operation steps of the MPU are shown as the schematic flow chart in FIG. 9(b).

Aforesaid Table 2 used in the present example is a table of the shutter time allowing the photographing in the natural light as well as a daylight synchronization which is the photographing in strobe flash (natural light+strobe flash photographing). The method of daylight synchronization employs a known concept of smaller aperture-priority. Smaller aperture-priority is a method wherein the smaller aperture (smaller stop) is preferred from the maximum aperture for the stop determined through AE and the stop value determined by both the guide number of strobe flash and the subject distance and then the strobe flash emission is made at the point of aforesaid stop value and at the same time the shutter-closing action is made. In this method, the shutter-closing action may be made concurrently with the strobe flash emission, therefore the emission timing for strobe flash is not indicated on the aforesaid table in the present example.

In Table 2, the shutter time values not greater than 2.6 m sec are indicated as 2.6 m sec and the ones not smaller than 20 m sec are indicated as 20 m sec. The reason for the foregoing is that it is difficult to control the shutter under the aperture diameter not greater than the diameter that represents F22 corresponding to the shutter time of 2.6 m sec. The reason for the limitation up to 20 m sec, on the other hand, is to prevent the camera-shake. Namely, within the range corresponding to 20 m sec, a low-brightness-warning (not shown in the figure) is given out thus calling a photographer's attention to flash photographing. Further, the constant shutter time on the low-brightness side in the strobe flash mode is the result of what the stop value based on the subject distance in the flash photographing explained earlier is preferred.

Following the first step of the release, if the second step $S_2$ of the release is closed to be the state of ON and an exposure-control-start-signal is given out, the MPU 8 electrifies, after electrifying the shutter magnet 51, the AF magnet 34 according to the memory value measured through the AF circuit 7 for the photographing lens to turn to the focal position and then stops electrifying the AM magnet 31 for the photographing lens to be fixed when it arrives at a predetermined position after its movement by turning. With this turning of the lens, the lever that causes the shutter-holding member to rotate also moves, thus the holding by the shutter-holding member is released after the photographing lens has been fixed.

Now, the construction and operation of the exposure control has been explained referring to FIG. 7. In the figure, the numeral 90 shows the optical axis of the photographing lens and 91 and 92 are the shutter blades A and B that take charge of shutter opening respectively. The figure shows the state of the closed shutter and the shutter is opened when the shutter blade A 91 moves to the left and the shutter blade B92 moves to the right simultaneously. In the construction, the shutter-opening is performed when the shutter-blade-lever 93 rotates counterclockwise.

As stated above, if the release-lever 95 that is the shutter-holding member is released and rotates counterclockwise, the shutter-blade-lever 93 rotates counterclockwise concurrently with the movements towards shutter-opening of the shutter blade A91 and shutter blade B92 both being interlocked with the shutter-blade lever 93. And then, the shutter trigger switch 99 {corresponding to ST in FIG. 8(a)} that is set so that it is turned OFF at the moment when the shutter opening reaches the preset opening is operated.

The MPU 8, on the other hand, keeps detecting the shutter trigger switch 99 to be turned OFF and after the detection of the OFF thereof, the shutter time is counted by the MPU 8 based on the data selected or selection-processed through Table 2.

At the moment when the release lever 95 is released, the shutter magnet 98 (corresponding to 51 in FIG. 4) is excessively electrified and therefore, the magnet lever 97 is prevented by the magnetic force from rotating. Under such condition, the shutter keeps opening until the MPU 8 completes counting the shutter time. Concurrently with the completion of shutter time counting, the MPU 8 turns ON the transistor 64 located in the strobe flash circuit 6 in the case of flash photographing, turns ON the thyrister 65 that triggers strobe flash and thus the strobe flash emission is performed. For the natural light photographing, it is naturally unnecessary to cause such strobe flash signals to be produced.

The MPU 8 cuts electrification through the shutter magnet 98 concurrently with the completion of shutter time counting. When the shutter magnet 98 loses its magnetic force, the magnet lever 97 is rotated counterclockwise by the spring force and the closing lever hook 96 rotates clockwise. The shutter closing lever 94 held by the closing lever hook 96 rotates clockwise and at the same time causes the shutter blade lever 93 to rotate clockwise which is opposite to the direction of shutter opening, thus the shutter is closed and the exposure is completed.

The mechanism section that has completed aforesaid shutter operation causes the magnet lever 97, with the help of the other charging member (not shown), to rotate clockwise and to be held by the release lever 95. After that, the shutter closing lever 94 is caused to rotate counterclockwise and to be held by the closing lever hook 96, thus the shutter-winding is completed.

In the aforesaid example, the shutter time values obtained from the combination of information from all information means and photometry information are stored in the memory means 4 and any one of the shutter time values is selected by each information but it is also possible to control the exposure by storing only a part of the data utilizing the processing function and the judgement function of the MPU 8. As for the ISO information of film speed, the difference between ISO 100 and ISO 200 corresponds to 1 EV of brightness information as is clear from the aforesaid Table 2, the switching of ISO information can easily be done through the simple processing.

Further, when the stop value for the low brightness in the smaller aperture-priority system with the use of strobe flash is preferred, if the photometry information from the distance information and the information of existence of strobe flash used is not higher than the specific EV, the shutter time can be constant. In the example of the present Table 2, when the film with the speed of ISO 100 is used and the strobe flash is used for the short subject distance, the shutter time can be 6.8 m sec which is constant for the photometry information not higher than EV 13.

As stated above, simple processing enables the ISO information to be switched between ISO 100 and ISO 200 for example and therefore the information of subject brightness and shutter time for only one of the film speeds have only to be stored. Consequently, the capacity of the memory means 4 can be small but the processing and judgement need to be performed by the MPU 8, therefore, it is effective when the information from the information means 3 is much in amount.

Figure 10A:
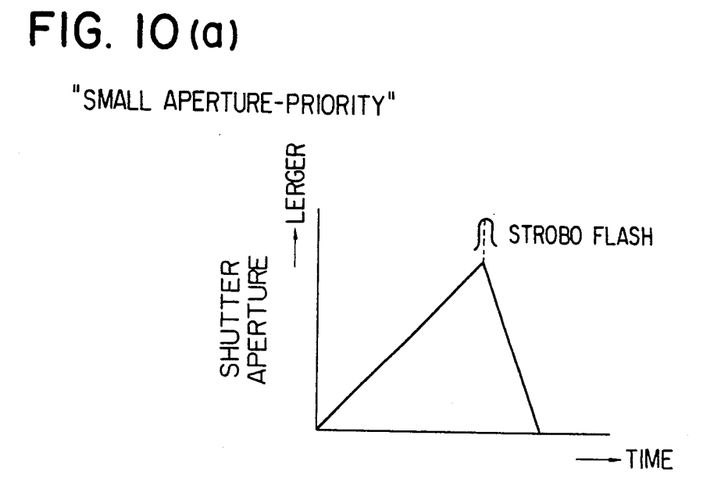
FIG. 10 shows the correlation betweenw the shutter aperture and the emission timing in the present invention.

In the exposure control system employing smaller aperture-priority as a method of daylight synchronization mentioned earlier, it is not necessary to store the strobe flash emission timing in the memory meand 4 in particular because the strobe flash emission timing synchronizes, as shown in FIG. 10(a), with the closing action of the shutter. Therefore, it has a merit that the capacity of the memory means 4 can be small. On the other hand, as a demerit of the smaller aperture-priority system, a photograph with an over-exposure by 1 EV may sometimes be obtained theoretically. This phenomenon corresponds to the occasion where the F value determined through AE is identical to the F value determined by the information of subject distance for flash photographing.

Figure 10B:
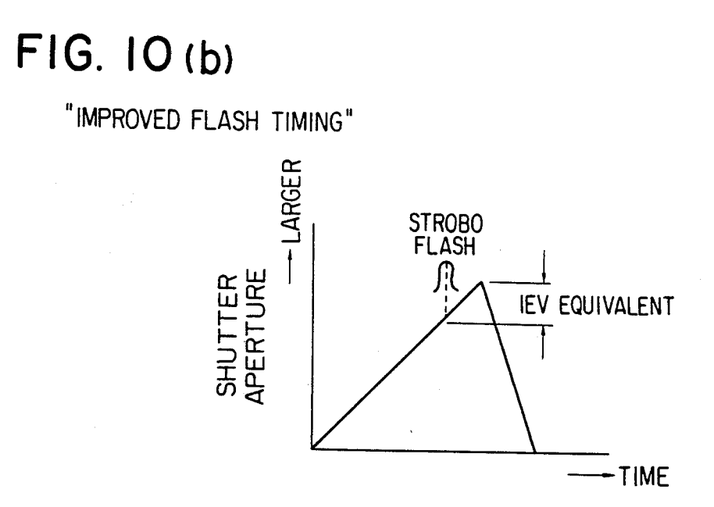

In order to avoid such an over-exposure by 1 EV, therefore, the memory capacity of the memory means 4 may be increased for the storage which arranges the strobe flash timing in the case of aforesaid conditions so that strobe flash emits with a timing corresponding to the aperture that is smaller by 1 EV equivalent than the F value determined by the subject distance information. In FIG. 10(b), this emission timing is illustrated.

In the example explained above, due to the shutter mechanism allowing the aperture-time characteristic which is relatively stable, it is possible to obtain photographs of fine quality without using the correction means in particular. However, it is necessary to correct the dispersion of aperture-time characteristic in the following cases.

(1) Photographs of higher quality are needed.
(2) The aperture-time characteristics are unstable owing to the cost reduction and others.

In the method to correct the dispersion of aperture-time characteristic, plural tables of aperture-time characterstc may be stored in the memory means 4, the aperture-time characteristic of the shutter is measured in the production of the camera, the control means 2 is instructed, according to the measured value, to select the peculiar table from the correction means, thus the control means 2 selects the particular value of shutter time and strobe flash emission timing based upon the value of the correction means.

Likewise, the means which is equal to the aforesaid correction means may be taken even when the aperture-time characteristic of the shutter varies in accordance with the change in temperature. Namely, the values obtained by the temperature detecting means are inputted to the control means 2 and at the same time plural tables corresponding to the temperature difference are stored in the memory means 4, thus the shutter time may be selected based on the data obtained by the temperature detecting means.

Incidentally, the two-step control as an automatic focusing control makes the explanation easy in the present example but it is naturally possible to improve the exposure accuracy for the natural light photographing complying with the multi-step control. Further in the strobe flash photographing, it is possible to cause the strobe flash to emit at any time while the shutter is opening and therefore it is possible to change the balance of the quantity of light contributing to the exposure between the natural light and the strobe flash light.

[Effects of the Invention]

Utilization of a digital integrated circuit, especially of a MPU as the control function in a camera of the present invention explained above produces a remarkable effect. The camera of the present invention makes it possible to simplify the mechanical structure of the shutter, causes the introduction of film speed and the exposure control after the changeover of film speed to be performed easily, makes the various exposure control especially with the use of artificial light such as the strobe flash light and others possible, gives a good balance between electrical elements and mechanical elements to the camera having electronics used therein and provides an exposure control means for flash photographing which offers good results of photographing even for the flash photographing.

What is claimed is:

1. A camera comprising
   a photometry means for measuring the brightness of a subject and producing a brightness signal representative of the measured brightness;
   a diaphragm shutter device, the aperture of which gradually opens from a closed-shutter condition to a full-open condition until the receipt of a closing command signal whereupon the aperture closes to the closed-shutter condition, said diaphragm-shutter device having a predetermined aperture opening operation time characteristic;
   an exposure control means having a memory, said memory storing a table listing items of possible subject brightness correlated with shutter close-timing information, said shutter close-timing information being predetermined to provide a desired exposure amount for each listed subject brightness based upon said time characteristic, and
   said exposure control means being responsive to the brightness signal for obtaining appropriate shutter close-timing information from said memory and outputting the closing command signal to said diaphragm-shutter device based upon the shutter close-timing information.

2. The camera according to claim 1, wherein aforesaid timing for the shutter-closing instruction corresponds to the shutter opening operation time.

3. The camera according to claim 1, wherein aforesaid timing information for the shutter-closing instruction corresponds to the shutter opening operation time that gives an optimum exposure for the prescribed ISO speed.

4. A camera comprising:
   a strobe flash emission device;
   a judgement means that judges whether the strobe flash emission device is operating or not;
   a film speed setting means tha produces the speed information of the film loaded in the camera;
   a photometry means that measures the subject brightness and produces the measurement results as a subject brightness information;
   a diapgragm shutter device that gradually opens from the closed-shutter condition to the full-open condition and then switches over to the closing action with a shutter-closing signal; and
   an exposure control means that receives at least aforesaid film speed information, aforesaid subject brightness information and the output from aforesaid judgment means and controls, based on aforesaid information, the operation of aforesaid diaphragm shutter device and the emission timing of aforesaid strobe flash emission device;
   wherein, aforesaid exposure control means has a memory means wherein a basic table that contains the classification of the subject brightness for the prescribed ISO speed and the timing information for the shutter-closing instruction each of which corresponds to each of the classification of subject brightness and that is for the non-use of the strobe flash emission device and another basic table that contains the classification of the subject brightness, the timing information for the shutter-closing instruction and the timing information for the emission of the strobe flash emission device each of aforesaid timing information corresponds to each of the classification of the subject brightness and that is for the use of the strobe flash emission device, are stored and said exposure control means converts the subject brightness information corresponding to the inputted film speed information into the information corresponding to aforesaid ISO speed and selects the timing information for the shutter-closing instruction corresponding to aforesaid converted information in the basic table corresponding to the information form aforesaid judgment means and/or the timing information for the emission of the strobe flash emission device, for the exposure.

5. The camera according to claim 4, wherein aforesaid prescribed ISO speed is ISO 100.

6. The camera according to claim 4, wherein the timing for the shutter-closing instruction corresponds to the shutter opening operation time.

7. The camera according to claim 4, wherein aforesaid film speed setting means is provided with a reader that reads the film speed from the film magazine.

8. The camera according to claim 4, wherein aforesaid photometry means has a photometry circuit comprising a light-responsive element or a light-responsive element unit that changes relating to the quantity of light from a subject, a series system of a capacitor and a comparator that compares the output of the capacitor with the standard voltage and aforesaid capacitor of series system is discharged or charged through the light-responsive element or the light-responsive element unit and a time period from the start of discharging or charging to the operation of aforesaid comparator is produced as a subject brightness information.

9. The camera of claim 5 wherein the timing for the shutter-closing instruction corresponds to the shutter opening operation time.

10. The camera of claim 4 wherein said emission timing for said strobe flash in the case where the strobe flash emission device is used is determined through the small aperture-priority system.

11. A camera comprising
    a photometry means for measuring the brightness of a subject and producing a brightness signal representative of the measured brightness;
    a range finding means for measuring the distance of a subject from said camera and producing a distance signal representative of a measured distance, a diaphragm-shutter device, the aperture of which gradually opens from a closed shutter condition to a full-open condition until receipt of a closing command signal whereupon the aperture closes to the closed-shutter condition, said diaphragm-shutter device having a predetermined aperturre opening operation time characteristic, a strobe flash emission device, an exposure control means having a memory, said memory storing a first table listing possible subject brightnesses correlated with shutter close-timing information, said shutter close-timing information being predetermined to provide a desired exposure amount for each listed subject brightness based upon said time characteristic, said memory further storing a second table listing possible subject distances correlated with strobe emission-timing information, said strobe emission-timing information being predetermined to provide a desired aperture size for each listed subject distance based upon said time characteristic, and said exposure control means being responsive to the brightness signal and the distance signal for obtaining appropriate shutter close-timing information and strobe-timing information from said memory, thereby controlling the operation of said diaphragm-shutter device and said strobe flash emission device.

12. The camera of claim 11 wherein said exposure control means compares the shutter close-timing information and the strobe emission timing information, selects the shorter time, and operates both said diaphragm-shutter device and said strobe flash emission device based upon the selected shorter time.

* * * * *